United States Patent
Yasunaga

(10) Patent No.: US 11,052,709 B2
(45) Date of Patent: Jul. 6, 2021

(54) PNEUMATIC TIRE

(71) Applicant: Toyo Tire & Rubber Co., Ltd., Itami (JP)

(72) Inventor: Toshikazu Yasunaga, Itami (JP)

(73) Assignee: TOYO TIRE CORPORATION, Itami (JP)

(*) Notice: Subject to any disclaimer, the term of this patent is extended or adjusted under 35 U.S.C. 154(b) by 281 days.

(21) Appl. No.: 16/210,421

(22) Filed: Dec. 5, 2018

(65) Prior Publication Data

US 2019/0176538 A1 Jun. 13, 2019

(30) Foreign Application Priority Data

Dec. 13, 2017 (JP) ............................. JP2017-238848

(51) Int. Cl.
*B60C 11/03* (2006.01)
*B60C 11/12* (2006.01)
*B60C 11/13* (2006.01)

(52) U.S. Cl.
CPC ...... *B60C 11/1307* (2013.01); *B60C 11/0302* (2013.01); *B60C 11/032* (2013.01); *B60C 11/0306* (2013.01); *B60C 11/0309* (2013.01); *B60C 11/1204* (2013.01); *B60C 11/1236* (2013.01); *B60C 11/1272* (2013.01); *B60C 11/1281* (2013.01); *B60C 2011/0346* (2013.01); *B60C 2011/0358* (2013.01); *B60C 2011/0381* (2013.01); *B60C 2011/0388* (2013.01); *B60C 2011/1209* (2013.01); *B60C 2011/1213* (2013.01); *B60C 2011/1227* (2013.01); *B60C 2011/1245* (2013.01); *B60C 2011/133* (2013.01)

(58) Field of Classification Search
CPC ............ B60C 11/1236; B60C 11/1307; B60C 11/1281; B60C 2011/133
See application file for complete search history.

(56) References Cited

U.S. PATENT DOCUMENTS

| | | | |
|---|---|---|---|
| 2004/0238092 A1 | 12/2004 | Colombo et al. | |
| 2012/0267021 A1* | 10/2012 | Guichon | B60C 11/1392 152/209.24 |
| 2016/0152087 A1* | 6/2016 | Hayashi | B60C 11/0309 152/209.18 |
| 2016/0250898 A1 | 9/2016 | Parr | |
| 2017/0239997 A1 | 8/2017 | Nishino | |

(Continued)

FOREIGN PATENT DOCUMENTS

| | | |
|---|---|---|
| CN | 105644273 A | 6/2016 |
| DE | 602 09 758 T2 | 11/2006 |
| DE | 11 2015 003 720 T5 | 5/2017 |

(Continued)

OTHER PUBLICATIONS

Machine translation for Japan 2004-136819 (Year: 2020).*

(Continued)

*Primary Examiner* — Steven D Maki
(74) *Attorney, Agent, or Firm* — Westerman, Hattori, Daniels & Adrian, LLP

(57) ABSTRACT

A pneumatic tire includes land portions defined by grooves, and sipes that are formed in the land portions and intersect the grooves. The sipes form acute angle portions and obtuse angle portions with the grooves. Notches are formed in the obtuse angle portions.

2 Claims, 5 Drawing Sheets

(56) References Cited

U.S. PATENT DOCUMENTS

2018/0272808 A1 9/2018 Nishino

FOREIGN PATENT DOCUMENTS

| | | |
|---|---|---|
| DE | 11 2016 000 438 T5 | 10/2017 |
| EP | 355636 A2 * | 2/1990 |
| JP | 2000-142035 A * | 5/2000 |
| JP | 2004-136819 A * | 5/2004 |
| JP | 2005-14644 A | 1/2005 |
| JP | 2005-47397 A | 2/2005 |
| JP | 2009-248961 A | 10/2009 |
| WO | 2015-066125 A1 | 5/2015 |

OTHER PUBLICATIONS

Machine translation for Japan 2000-142035 (Year: 2020).*
Office Action dated Jun. 30, 2020, issued in counterpart CN Application No. 201811373766.9, with abridged machine Translation. (9 pages).
Office Action dated Feb. 1, 2021, issued in counterpart DE Application No. 10 2018 221 505.7, with English Translation. (14 pages).
Office Action dated Nov. 23, 2020, issued in counterpart CN application No. 201811373766.9, with English Translation. (9 pages).

* cited by examiner

PNEUMATIC TIRE

CROSS-REFERENCE TO RELATED APPLICATIONS

This application is based on Japanese Patent Application No. 2017-238848 (filed on Dec. 13, 2017) and claims priority from Japan Patent Application No. 2017-238848. The present disclosure incorporates entire contents of Japanese Patent Application No. 2017-238848.

TECHNICAL FIELD

The present disclosure relates to a pneumatic tire.

BACKGROUND ART

As disclosed in Patent Documents 1 to 4, in a studless tire in which sipes are formed in blocks, it is known that block ends are formed in a zigzag manner in a portion where a sipe intersects a groove. Such a pneumatic tire is considered to have an excellent edge effect as disclosed in Patent Document 2 or Patent Document 4 and is considered suitable for traveling on snow.

Patent Document 1: WO 2015-066125
Patent Document 2: JP-A-2005-014644
Patent Document 3: JP-A-2009-248961
Patent Document 4: JP-A-2005-047397

DISCLOSURE OF THE INVENTION

Problem that the Invention is to Solve

However, in the related art, detailed examination of a shape of the block end or the like in a state where an effect with snow is considered has not been executed.

Therefore, the present disclosure is to provide a pneumatic tire that is more suitable for traveling on snow in a state where an effect with snow is considered.

Means for Solving the Problem

A pneumatic tire of an embodiment includes land portions defined by grooves and sipes that are formed in the land portions and intersect the grooves, the sipes forming acute angle portions and obtuse angle portions with the grooves, in which notches are formed in the obtuse angle portions.

Advantage of the Invention

The pneumatic tire of the embodiment is suitable for traveling on snow because the acute angle portions bite into snow so that the notches form snow pillars.

BEST MODE FOR CARRYING OUT THE INVENTION

Figure 1:
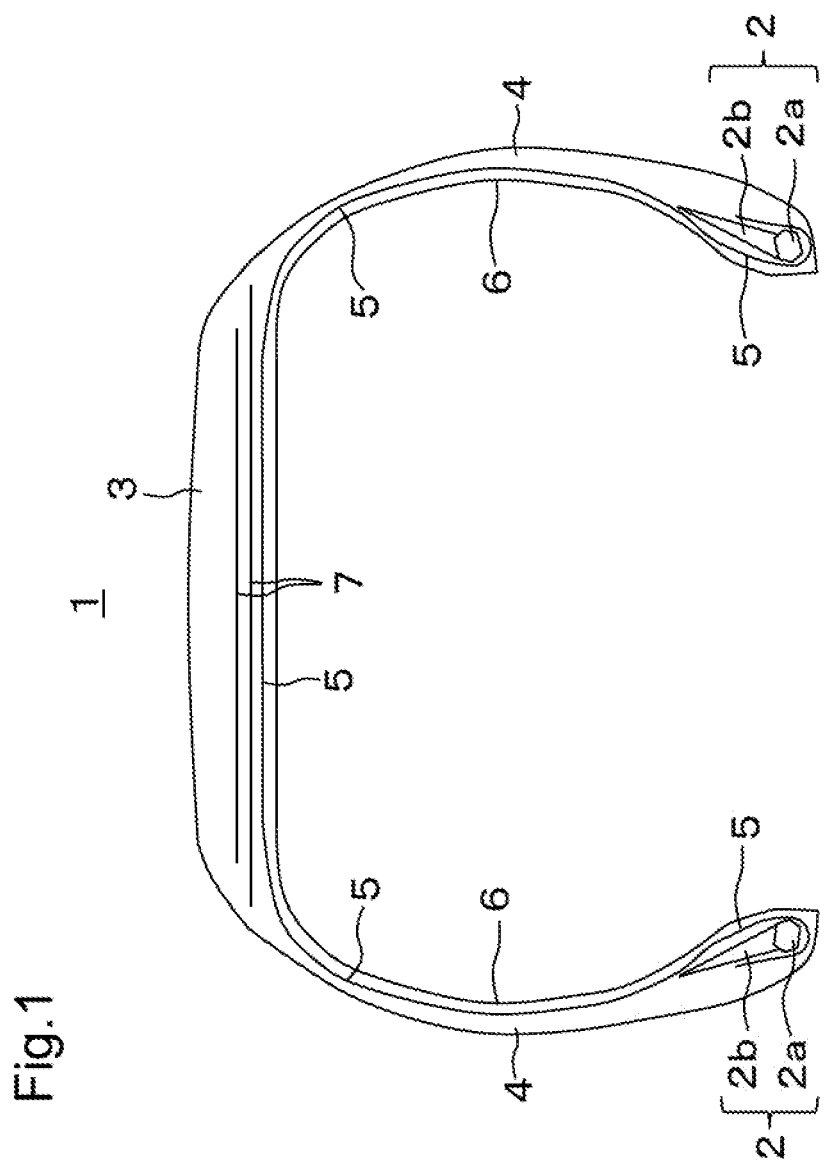
FIG. 1 A cross-sectional view in the width direction of a pneumatic tire of an embodiment.

As illustrated in FIG. 1, a bead portion 2 is provided on both sides in a tire width direction of a pneumatic tire 1. The bead portion 2 is constituted by a bead core 2a made of a steel wire wound in a circular shape and a bead filler 2b made of rubber and provided on a radial outer side of the bead core 2a. A carcass ply 5 is laid across the bead portion 2 on both sides of the tire width direction. The carcass ply 5 is a sheet type member in which a plurality of ply cords arranged in a direction orthogonal to a circumferential direction of the tire are covered with rubber. The carcass ply 5 forms a frame shape of the pneumatic tire 1 between the bead portions 2 on both sides of the tire width direction, and surrounds the bead portions 2 by folding back from inside to outside in the tire width direction around the bead portions 2. A sheet type inner liner 6 made of rubber having low air permeability is adhered to the inside of the carcass ply 5.

One or a plurality of belts 7 are provided on the tire radial outer side of the carcass ply 5. The belt 7 is a member made by covering a plurality of steel-based cords with rubber. A tread rubber 3 having a grounding surface with a road surface (hereinafter, referred to as a "grounding surface") is provided on the tire radial outer side of the belt 7. Further, a side wall rubber 4 is provided on both sides of the tire width direction of the carcass ply 5. In addition to these members, according to functional requirements of the pneumatic tire 1, members, for example, a belt lower pad or a chafer are provided.

Figure 2:
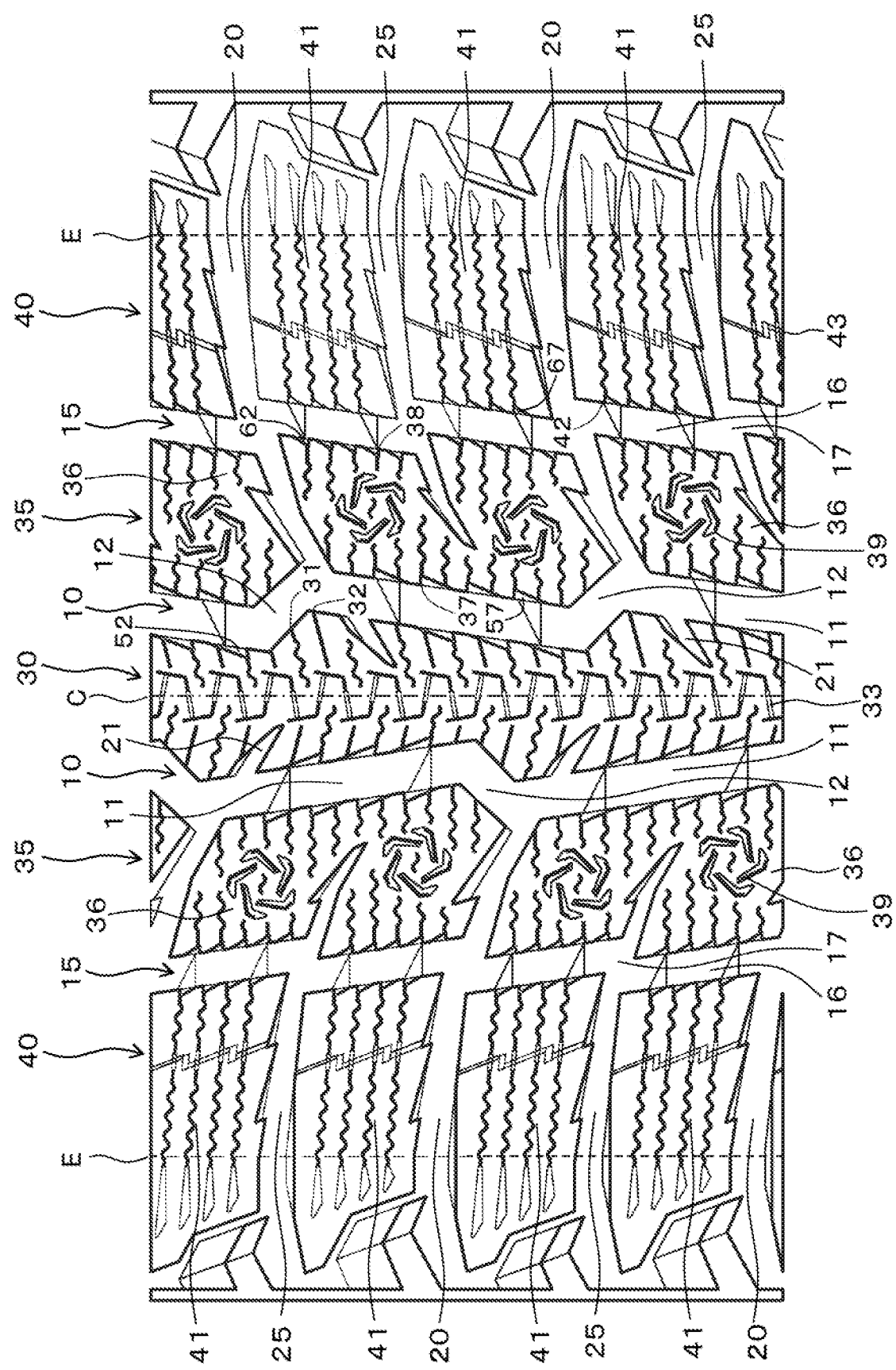
FIG. 2 A tread pattern of the pneumatic tire of the embodiment.

A tread pattern illustrated in FIG. 2 is formed on a surface of the tread rubber 3. In FIG. 2, the vertical direction is the circumferential direction of the tire, and the lateral direction is the tire width direction. In this tread pattern, as a main groove that extends in the circumferential direction of the tire and has a wide width, a total of four main grooves, that is, two center main grooves 10 in a center region in the tire width direction that is close to a tire equator C and two shoulder main grooves 15 in an outer region in the tire width direction that is close to a tire grounding end E are formed. Then, a center land portion 30 between the two center main grooves 10, a mediate land portion 35 between the center main groove 10 and the shoulder main groove 15, and a shoulder land portion 40 between the shoulder main groove 15 and the tire grounding end E are provided.

Here, the land portion is a portion formed by being partitioned by grooves. Further, the tire grounding end E is an end portion of the grounding surface in the tire width direction in a loaded state. The loaded state is a state where the pneumatic tire is rim-assembled into a normal rim to be a normal inner pressure and loaded by a normal load. Here, the normal rim is a standard rim defined by standards such as JATMA, TRA, and ETRTO. Further, the normal load is a maximum load defined in the above standards. Further, the normal inner pressure is an inner pressure corresponding to the maximum load.

The center main groove 10 includes long first groove portions 11 that extend obliquely with respect to the circumferential direction of the tire, and short second groove portions 12 that are inclined with respect to the circumferential direction of the tire and extend in a direction different from that of the first groove portion 11. Then, a first groove portion 11 and a second groove portion 12 are arranged alternately, and thus, the center main groove 10 is formed in a zigzag shape. In FIG. 2, a lower side is grounded first during rolling of the tire (that is, when the vehicle is traveling). As can be seen from the drawing, the first groove portion 11 is inclined such that a portion to be grounded later (in other words, a rear side in the rolling direction) heads toward the tire grounding end E side.

Further, the shoulder main groove 15 includes long first groove portions 16 that extend obliquely with respect to the circumferential direction of the tire, and short second groove portions 17 that are inclined with respect to the circumferential direction of the tire and extend in a direction different from that of the first groove portion 16. Then, the first groove portions 16 and second groove portions 17 are arranged alternately, and thus, the shoulder main groove 15 has a zigzag shape. As can be seen from FIG. 2, the first groove portion 16 is inclined such that a portion to be grounded later heads toward the tire grounding end E side.

Further, as lateral grooves that extend in the tire width direction, first lateral grooves 20 and second lateral grooves 25 are formed. The first lateral groove 20 traverses the shoulder land portion 40 and the mediate land portion 35, and extends to the center land portion 30 and is closed in the center land portion 30. Therefore, a notch 21 that is a part of the first lateral grooves 20 is formed in the center land portion 30. Further, the second lateral groove 25 traverses the shoulder land portion 40, and extends to the mediate land portion 35 and is closed in the mediate land portion 35. Although not illustrated, the second lateral groove 25 may also traverse the mediate land portion 35 and end in a portion that is opened in the center main groove 10. Such first lateral grooves 20 and second lateral grooves 25 are alternately arranged in the circumferential direction of the tire. The second groove portion 17 of the shoulder main groove 15 overlaps with the first lateral groove 20 and the second lateral groove 25.

With the configuration of the groove as described above, the center land portion 30 between the two center main grooves 10 is configured as a rib extending in the circumferential direction of the tire without being divided by lateral grooves. Further, the mediate land portion 35 is divided by at least the first lateral groove 20, and thus, is a row of a plurality of mediate blocks 36 arranged in the circumferential direction of the tire. Further, the shoulder land portion 40 is divided by the first lateral groove 20 and the second lateral groove 25, and thus, is a row of a plurality of shoulder blocks 41 arranged in the circumferential direction of the tire.

Sipes are formed in the center land portion 30, the mediate blocks 36, and the shoulder blocks 41, respectively. Here, a sipe is a narrow groove having a narrow width where the opening end to the grounding surface is closed in the loaded state.

Figure 3:
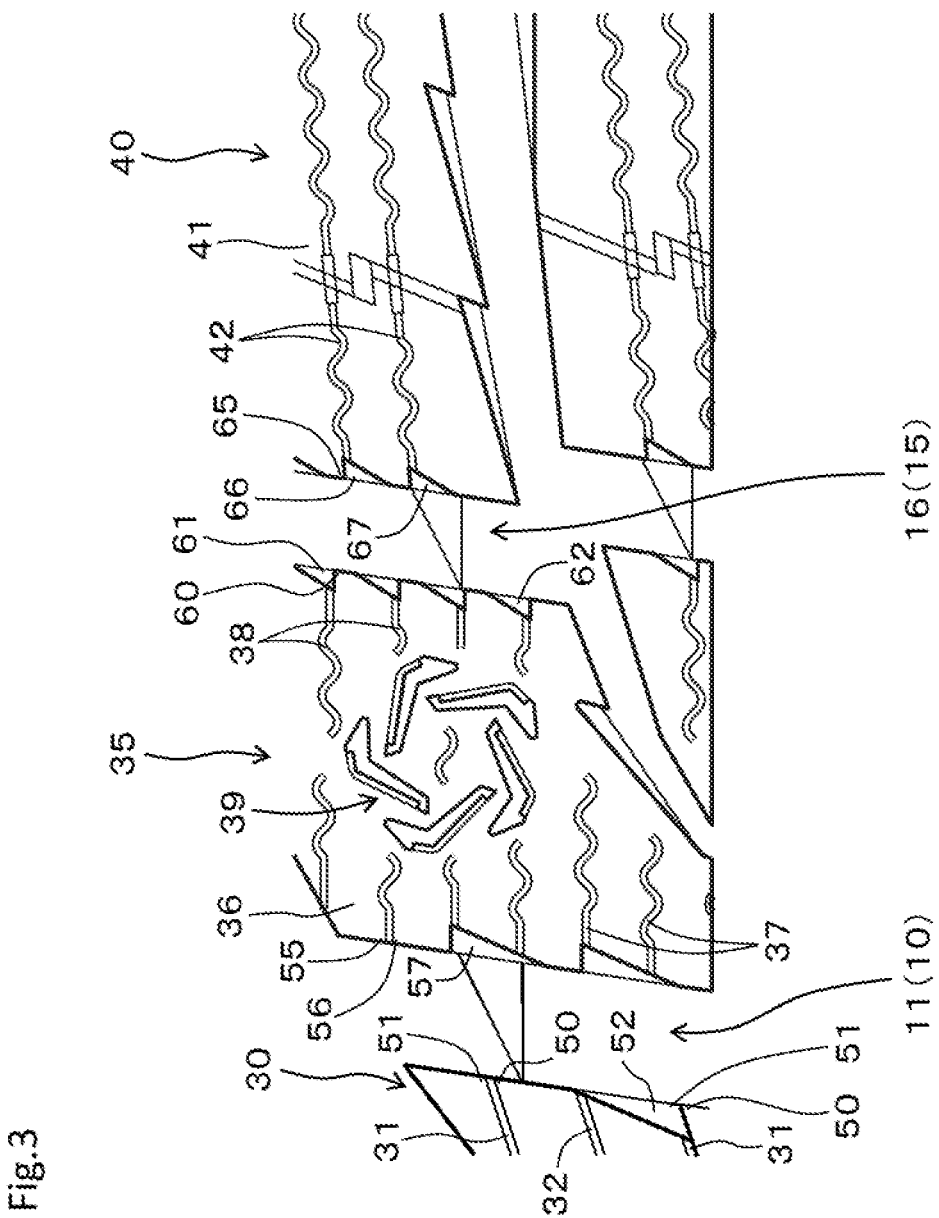
FIG. 3 An enlarged view of the vicinity of a main groove of the tread pattern of FIG. 2.

As illustrated in FIGS. 2 and 3, as a sipe of the center land portion 30, a first center sipe 31 intersecting the center main groove 10 (that is, being opened to the center main groove 10) is formed. The first center sipe 31 extends obliquely with respect to a direction orthogonal to the extension direction of the center main groove 10. Therefore, as illustrated in FIG. 3, the first center sipe 31 forms an acute angle portion 50 and an obtuse angle portion 51 with the center main groove 10.

The acute angle portion is a portion having an acute angle that is formed at an intersection portion between the sipe and the main groove, and the obtuse angle portion is a portion having an obtuse angle that is formed at an intersection portion between the sipe and the main groove. Here, whether the angle is an acute angle or an obtuse angle is determined by viewing the tread pattern from a direction perpendicular to the tire grounding surface.

Sipes other than the first center sipe 31 may be formed in the center land portion 30. For example, in the case of the embodiment of FIG. 2, a second center sipe 32 extending in parallel to the first center sipe 31 is formed between the two first center sipes 31. In the case of the embodiment of FIG. 2, in a plan view (that is, as viewed from the tire outer diameter), the first center sipe 31 is wavy, and the second center sipe 32 is straight. However, the first center sipe 31 may be straight in a plan view, and the second center sipe 32 may be wavy in a plan view.

Further, in the center land portion 30, a third center sipe 33 extending in the circumferential direction of the tire while being bent periodically is formed in the region including the tire equator C.

In addition, as a sipe in the mediate block 36, a first mediate sipe 37 intersecting the center main groove 10 and a second mediate sipe 38 intersecting the shoulder main groove 15 are formed. In FIGS. 2 and 3, the first mediate sipe 37 and the second mediate sipe 38 are wavy in a plan view, but at least one of them may be straight in a plan view.

The first mediate sipe 37 extends obliquely with respect to a direction orthogonal to the extension direction of the center main groove 10. Therefore, as illustrated in FIG. 3, the first mediate sipe 37 forms an acute angle portion 55 and an obtuse angle portion 56 with the center main groove 10. Further, the second mediate sipe 38 extends obliquely with respect to a direction orthogonal to the extension direction of the shoulder main groove 15. Therefore, as illustrated in FIG. 3, the second mediate sipe 38 forms an acute angle portion 60 and an obtuse angle portion 61 with the shoulder main groove 15.

Sipes other than the first mediate sipe 37 and the second mediate sipe 38 may be formed in the mediate block 36. For example, in the case of the embodiment illustrated in FIGS. 2 and 3, third mediate sipes 39 arranged in an annular shape is formed.

Further, as a sipe in the shoulder block 41, a first shoulder sipe 42 intersecting the shoulder main groove 15 is provided. In FIGS. 2 and 3, the first shoulder sipe 42 is wavy in a plan view, but it may be straight in a plan view. The first shoulder sipe 42 extends obliquely with respect to a direction orthogonal to the extension direction of the shoulder main groove 15. Therefore, as illustrated in FIG. 3, the first shoulder sipe 42 forms an acute angle portion 65 and an obtuse angle portion 66 with the shoulder main groove 15.

Sipes other than the first shoulder sipe 42 may be formed in the shoulder block 41. For example, in the case of the embodiment of FIG. 2, a second shoulder sipe 43 extending in the circumferential direction of the tire is formed.

Figure 4:
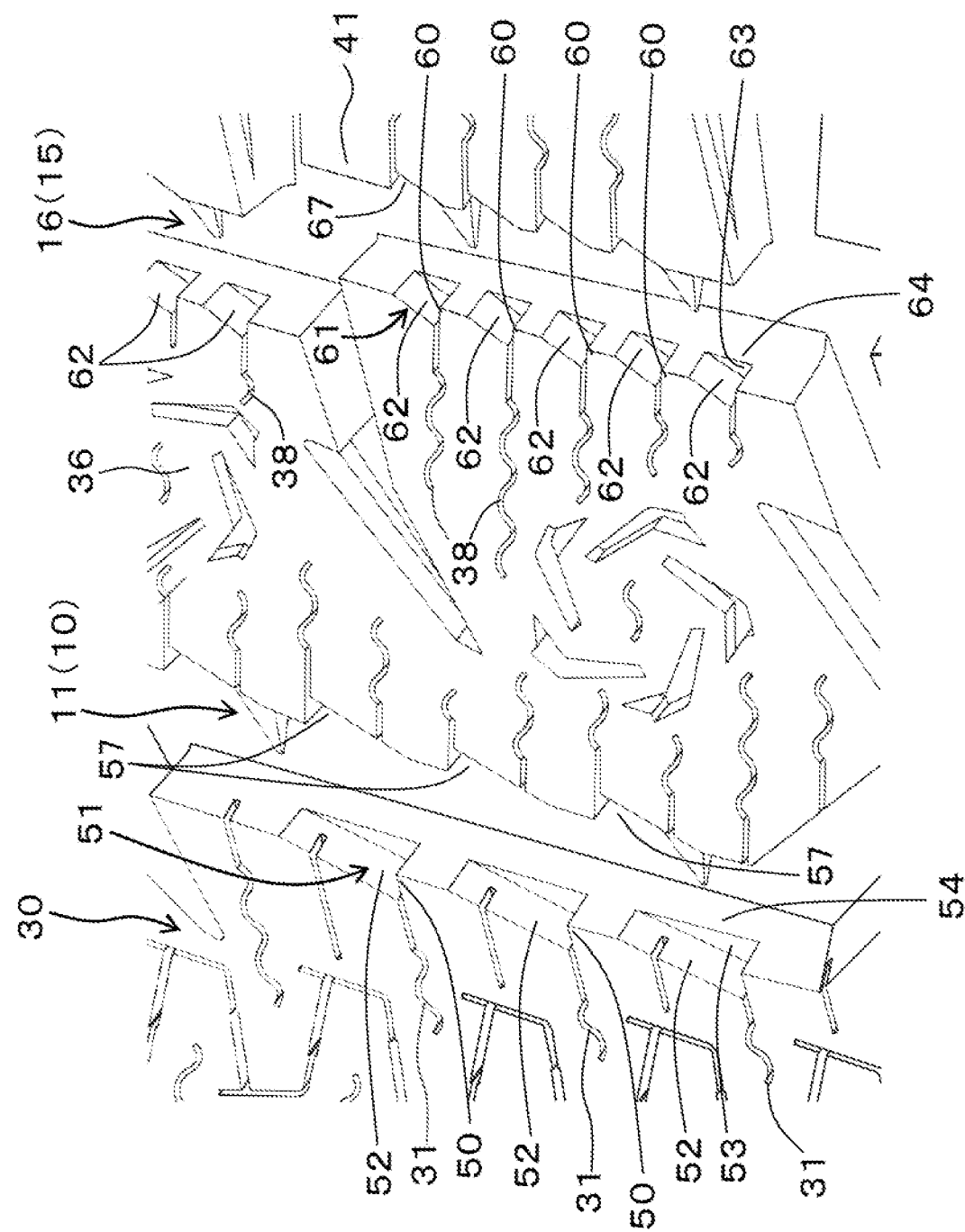
FIG. 4 A perspective view of the vicinity of a portion illustrated in FIG. 3.

In the tread pattern described above, as illustrated in FIGS. 2 to 5, a notch is formed at each obtuse angle portion. Specifically, as illustrated in FIG. 4 and the like, in the obtuse angle portion 51 between the first center sipe 31 and the center main groove 10, a triangular notch 52 is formed with the first center sipe 31 as one side thereof and a boundary between the center main groove 10 and the center land portion 30 as another side thereof. The plurality of first center sipes 31 are formed for the first groove portion 11 that is one of the center main grooves 10, and notches 52 are formed for the plurality of first center sipes 31. Therefore, in a portion where the plurality of notches 52 are arranged along the first groove portion 11, the acute angle portion 50 exists between the two notches 52, and the acute angle portion 50 has a shape protruding toward the center main groove 10 side.

As illustrated in FIG. 4, a bottom surface 53 of the notch 52 is an upper surface of a shelf portion 54 that is higher than a bottom portion of the center main groove 10. Therefore, the notch 52 is shallower than the center main groove 10. A depth of the notch 52 (that is, a depth from the grounding surface to the bottom surface 53) may be 60% or less of the depth of the center main groove 10.

Figure 5:
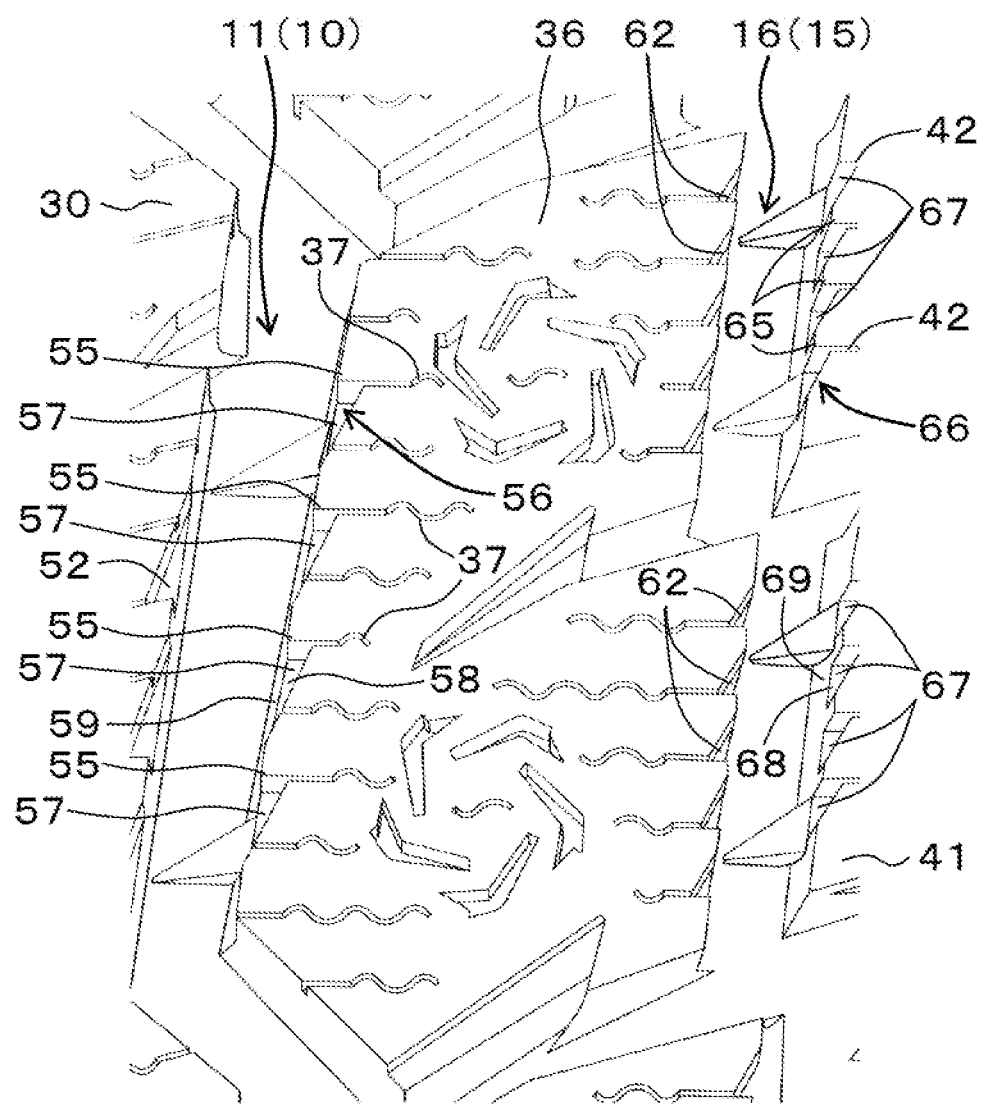
FIG. 5 A perspective view of the vicinity of a portion illustrated in FIG. 3 as viewed from an angle different from that of FIG. 4.

Further, as illustrated in FIG. 5 and the like, in the obtuse angle portion 56 between the first mediate sipe 37 and the center main groove 10, a triangular notch 57 is formed with the first mediate sipe 37 as one side thereof and a boundary between the center main groove 10 and the mediate block 36 as another side thereof. The plurality of first mediate sipes 37 are formed for the first groove portion 11 that is one of the center main grooves 10, and notches 57 are formed for the plurality of first mediate sipes 37. Therefore, in a portion where the plurality of notches 57 are arranged along the first groove portion 11, the acute angle portion 55 exists between the two notches 57, and the acute angle portion 55 has a shape protruding toward the center main groove 10 side.

As illustrated in FIG. 5, a bottom surface 58 of the notch 57 is an upper surface of a shelf portion 59 that is higher than a bottom portion of the center main groove 10. Therefore, the notch 57 is shallower than the center main groove 10. A depth of the notch 57 (that is, a depth from the grounding surface to the bottom surface 58) may be 60% or less of the depth of the center main groove 10.

As described above, the notches 52 and the notches 57 are formed on both sides of the width direction of the center main groove 10. The notch 52 on the center land portion 30 side and the notch 57 on the mediate block 36 side are formed on the opposite side of the circumferential direction of the tire with respect to the sipe, and are configured to be tapered toward the opposite side of the circumferential direction of the tire. Further, the acute angle portion 50 on the center land portion 30 side and the acute angle portion 55 on the mediate block 36 side have a shape protruding toward the opposite side in the circumferential direction of the tire.

Further, as illustrated in FIG. 4 and the like, in the obtuse angle portion 61 between the second mediate sipe 38 and the shoulder main groove 15, a triangular notch 62 is formed with the second mediate sipe 38 as one side thereof and a boundary between the shoulder main groove 15 and the mediate block 36 as another side thereof. The plurality of second mediate sipes 38 are formed for the first groove portion 16 that is one of the shoulder main grooves 15, and notches 62 are formed for the plurality of second mediate sipes 38. Therefore, in a portion where the plurality of notches 62 are arranged along the first groove portion 16, the acute angle portion 60 exists between the two notches 62, and the acute angle portion 60 has a shape protruding toward the shoulder main groove 15 side.

As illustrated in FIG. 4, a bottom surface 63 of the notch 62 is an upper surface of a shelf portion 64 that is higher than a bottom portion of the shoulder main groove 15. Therefore, the notch 62 is shallower than the shoulder main groove 15. A depth of the notch 62 (that is, a depth from the grounding surface to the bottom surface 63) may be 60% or less of the depth of the shoulder main groove 15.

Further, as illustrated in FIG. 5 and the like, in the obtuse angle portion 66 between the first shoulder sipe 42 and the shoulder main groove 15, a triangular notch 67 is formed with the first shoulder sipe 42 as one side thereof and a boundary between the shoulder main groove 15 and the shoulder block 41 as another side thereof. The plurality of first shoulder sipes 42 are formed for the first groove portion 16 that is one of the shoulder main grooves 15, and notches 67 are formed for the plurality of first shoulder sipes 42. Therefore, in a portion where the plurality of notches 67 are arranged along the first groove portion 16, the acute angle portion 65 exists between the two notches 67, and the acute angle portion 65 has a shape protruding toward the shoulder main groove 15 side.

As illustrated in FIG. 5, a bottom surface 68 of the notch 67 is an upper surface of a shelf portion 69 that is higher than a bottom portion of the shoulder main groove 15. Therefore, the notch 67 is shallower than the shoulder main groove 15. A depth of the notch 67 (that is, a depth from the grounding surface to the bottom surface 68) may be 60% or less of the depth of the shoulder main groove 15.

As described above, the notches 62 and the notches 67 are formed on both sides of the width direction of the shoulder main groove 15. The notch 62 on the mediate block 36 side and the notch 67 on the shoulder block 41 side are formed on the opposite side of the circumferential direction of the tire with respect to the sipe, and are configured to be tapered toward the opposite side of the circumferential direction of the tire. Further, the acute angle portion 60 on the mediate block 36 side and the acute angle portion 65 on the shoulder block 41 side have a shape protruding toward the opposite side in the circumferential direction of the tire.

As described above, in the center region in the tire width direction, the plurality of notches 52 and the plurality of notches 57 are formed on both sides of the width direction of the center main groove 10, respectively. Further, in the outer region in the tire width direction, the plurality of notches 62 and the plurality of notches 67 are formed on both sides of the width direction of the shoulder main groove 15, respectively. Comparing the notches 52 and 57 in the center region in the tire width direction with the notches 62 and 67 in the outer region in the tire width direction, the notches 62 and 67 in the outer region in the tire width direction are smaller than the notches 52 and 57 in the center region in the tire width direction. Further, the notches 62 and 67 in the outer region in the tire width direction are larger in number per unit length in the circumferential direction of the tire than the notches 52 and 57 in the center region in the tire width direction.

As described above, in the pneumatic tire 1 in which the grooves and the Sipes form the acute angle portions 50, 55, 60, and 65 and the obtuse angle portions 51, 56, 61, and 66, the notches 52, 57, 62, and 67 are formed in the obtuse angle portions 51, 56, 61, and 66. Therefore, when the pneumatic tire 1 is traveling on snow, snow enters into the notches 52, 57, 62, and 67. Then, the snow which has entered into the notches 52, 57, 62, and 67 is compressed into snow pillars, and the snow pillars become hooking portions against the tread. Furthermore, since the notches 52, 57, 62, and 67 are formed in the obtuse angle portions 51, 56, 61, and 66, the acute angle portions 50, 55, 60, and 65 having sharp tips protrude toward the grooves. Then, these acute angle portions 50, 55, 60, and sufficiently bite into snow. For these reasons, the pneumatic tire 1 is excellent in traction performance on snow, and then, is suitable for traveling on snow.

Further, the bottom surfaces 53, 58, 63, and 68 of the notches 52, 57, 62, and 67 are higher than the bottom portions of the adjacent grooves and the depth of the notches 52, 57, 62, and 67 is shallower than that of the adjacent grooves. Therefore, the rigidity of the acute angle portions 50, 55, 60, and 65 is secured. Particularly, when the depth of the notches 52, 57, 62, and 67 is 60% or less of the depth of the adjacent grooves, the rigidity of the acute angle portions 50, 55, 60, and 65 is sufficient.

Further, since the notches 52, 57, 62, and 67 are formed in the center region in the tire width direction and the outer region in the tire width direction, traction performance is generated in the entire tread.

Further, during traveling, in most cases, the outer region in the tire width direction has lower grounding pressure than that of the center region in the tire width direction. Therefore, in the outer region in the tire width direction, the snow which has entered into recesses in the tire is difficult to be compressed so that snow pillars are hardly formed. However, in the embodiment, since the notches 62 and 67 in the outer region in the tire width direction are smaller than the notches 52 and 57 in the center region in the tire width direction, the snow which has entered into the notches 62 and 67 in the outer region in the tire width direction is likely to be compressed and easily forms snow pillars. Here, although each snow pillar formed by the notches 52 and 57 in the center region in the tire width direction is small, since the number of notches 52 and 57 per unit length in the circumferential direction of the tire is large, large traction performance is generated all over the plurality of notches 62 and 67.

Further, the triangular notches 52 and 57 and the acute angle portions 50 and 55 are formed on both sides in the width direction of the center main groove 10, the notches 52 and the notches 57 are tapered toward the opposite side in the circumferential direction of the tire, and the acute angle portions 50 and the acute angle portions 55 protrude toward the opposite side in the circumferential direction of the tire. Therefore, traction performance is good for both front and rear direction.

Further, the triangular notches 62 and 67 and the acute angle portions 60 and 65 are formed on both sides in the width direction of the shoulder main groove 15, the notches 62 and the notches 67 are tapered toward the opposite side in the circumferential direction of the tire, and the acute angle portions 60 and the acute angle portions 65 protrude toward the opposite side in the circumferential direction of the tire. Therefore, traction performance is good for both front and rear direction.

The above embodiments are examples, and the scope of the present disclosure is not limited thereto. Various modifications may be made to the above embodiments within the scope without escaping from the purpose of the present disclosure.

DESCRIPTION OF REFERENCE NUMERALS AND SIGNS

C . . . tire equator, E . . . tire grounding end, 1 . . . pneumatic tire, 2 . . . bead portion, 2*a* . . . bead core, 2*b* . . . bead filler, 3 . . . tread rubber, 4 . . . side wall rubber, 5 . . . carcass ply, 6 . . . inner liner, 7 . . . belt, 10 . . . center main groove, 11 . . . first groove portion, 12 . . . second groove portion, 15 . . . shoulder main groove, 16 . . . first groove portion, 17 . . . second groove portion, 20 . . . first lateral groove, 21 . . . notch, 25 . . . second lateral groove, 30 . . . center land portion, 31 . . . first center sipe, 32 . . . second center sipe, 33 . . . third center sipe, 35 . . . mediate land portion, 36 . . . mediate block, 37 . . . first mediate sipe, 38 . . . second mediate sipe, 39 . . . third mediate sipe, 40 . . . shoulder land portion, 41 . . . shoulder block, 42 . . . first shoulder sipe, 43 . . . second shoulder sipe, 50 . . . acute angle portion, 51 . . . obtuse angle portion, 52 . . . notch, 53 . . . bottom surface, 54 . . . shelf portion, 55 . . . acute angle portion, 56 . . . obtuse angle portion, 57 . . . notch, 58 . . . bottom surface, 59 . . . shelf portion, 60 . . . acute angle portion, 61 . . . obtuse angle portion, 62 . . . notch, 63 . . . bottom surface, 64 . . . shelf portion, 65 . . . acute angle portion, 66 . . . obtuse angle portion, 67 . . . notch, 68 . . . bottom surface, 69 . . . shelf portion

The invention claimed is:

1. A pneumatic tire, comprising:
    land portions defined by grooves; and
    sipes that are formed in the land portions and intersect the grooves, the sipes forming acute angle portions and obtuse angle portions with the grooves,
    wherein notches are formed at the obtuse angle portions,
    wherein the notches are respectively provided in a center region and an outer region in a tire width direction, and the notches in the outer region are smaller than the notches in the center region and are larger in number per unit length in the circumferential direction of the tire than the notches in the center region,
    wherein two center main grooves are formed on a tire equator side and two shoulder main grooves are formed on a tire grounding end side as the grooves, and
    wherein the notches in the center region are disposed in both sides of the center main grooves, and the notches in the outer region are disposed in both sides of the shoulder main grooves.

2. The pneumatic tire according to claim 1, wherein the grooves are main grooves that extend in a circumferential direction of the tire.

* * * * *